United States Patent [19]

Olper et al.

[11] Patent Number: 5,030,520

[45] Date of Patent: Jul. 9, 1991

[54] ELECTRICAL CONDUCTOR, IN PARTICULAR SUITABLE FOR USE AS AN INSOLUBLE ANODE IN ELECTROWINNING PROCESSES, AND IN ELECTROCHEMICAL PROCESSES IN GENERAL, AND PROCESS FOR PRODUCING IT

[75] Inventors: Marco Olper, Monza; Pierluigi Fracchia, Milan; Fulvio Redivo, Turin, all of Italy

[73] Assignee: Engitec Impianti S.p.A., Milan, Italy

[21] Appl. No.: 306,620

[22] Filed: Feb. 6, 1989

[30] Foreign Application Priority Data

Feb. 11, 1988 [IT] Italy .............................. 19379 A/88

[51] Int. Cl.[5] ......................... B32B 15/00; C25D 5/10

[52] U.S. Cl. .................................... 428/660; 428/662; 428/674

[58] Field of Search ........................ 428/660, 662, 674

[56] References Cited

U.S. PATENT DOCUMENTS

| | | | |
|---|---|---|---|
| 4,042,753 | 8/1977 | Smith | 428/660 |
| 4,305,998 | 12/1981 | Manty | 428/660 |

*Primary Examiner*—Peter D. Rosenberg
*Attorney, Agent, or Firm*—Foley & Lardner, Schwartz, Jeffery, Schwaab, Mack, Blumenthal & Evans

[57] ABSTRACT

An electrical conductor is particularly suitable for use as an insoluble anode in electrowinning processes, and is composed of an inner core of copper coated with an outer, thinner layer of a transition metal, preferably selected from among tantalum, titanium and niobium. The conductor is manufactured by a process including the steps of inserting a copper bar inside a relatively thin tube made of the selected transition metal, inserting the tube containing the copper bar inside a copper tube to obtain a three-metal structure, submitting the three-metal structure to a drawing process to produce a three metal wire, and dipping the three-metal wire in a solvent to remove the outer copper layer to produce a bimetallic wire.

18 Claims, No Drawings

ELECTRICAL CONDUCTOR, IN PARTICULAR SUITABLE FOR USE AS AN INSOLUBLE ANODE IN ELECTROWINNING PROCESSES, AND IN ELECTROCHEMICAL PROCESSES IN GENERAL, AND PROCESS FOR PRODUCING IT

BACKGROUND OF THE INVENTION

It is known that the insoluble anodes for use in the electrowinning of cells for heavy metal production, such as, e.g., lead, zinc and lead, impose the use of semi-finished pieces having values of cross-section surface area and of mechanical strength adequate for conducting electrical currents of considerable intensity, and suitable for building strong structures, which are capable of being not deformed by possible impacts, and of maintaining a precise position inside the cell.

Substantially, it is necessary that such insoluble anodes, owing to reasons of electrical current conduction, as well as reasons of mechanical strength, have a good firmness, as well as a certain weight.

While keeping into due account said basic requirement, for a long time those skilled in the art have been looking for an ideal material for manufacturing insoluble anodes, which also makes it possible above all characteristics of long useful life to be achieved in the anode, even under severe operating conditions. Therefore, such search is directed towards materials which, while being endowed with an at least rather good electrical conductivity and mechanical strength, also simultaneously display a high chemical inertness towards the more aggressive and corrosive agents.

In this connection, tantalum, niobium and titanium, metals endowed with good ductility and malleability, as well as with a rather good heat and electrical conductivity, are appreciated above all thanks to their chemical inertness towards the most aggressive media.

Tantalum, in particular, by getting coated by an extremely thin oxide layer, becomes resistant to nearly all reactants, at temperatures of up to 200°-300° C. Only hydrofluoric acid, fluorides, hot concentrated alkalies and sulphur trioxide are capable of attacking such an oxide, and then the same metal.

However, such a rare metal is known to have a very high cost.

From the viewpoint of chemical resistance, having available insoluble tantalum anodes would represent the ideal solution. But, as we saw, such anodes should also comply with such requirements of firmness, weight and cross-section surface-area, as to supply very good guarantees of mechanical strength and of electrical conductivity, so that for that purpose insoluble tantalum anodes should be manufactured, having so large values of weight and dimensions, as to make the manufacturing thereof impracticable at an industrial level, owing to the extremely high cost of such a metal.

The same problem substantially exists for niobium and titanium too.

SUMMARY OF THE INVENTION

Therefore, the purpose of the present invention is to provide an electricity conducting element, in particular suitable for use as an insoluble anode, which, on one hand, advantageously combines within itself all of the necessary characteristics of use, viz., mechanical strength and non-deformability, capability of conducting high-intensity electrical currents, resistance to the most aggressive chemicals, and, on the other hand, does not require too high production costs.

All these characteristics, and still other advantages, are achieved according to the present invention by means of an electrical conductor, in particular suitable for use as an insoluble anode in electrowinning processes, characterized in that it is constituted by a bimetallic wire composed by an inner core of copper coated by an outer, thinner layer of a transition metal, preferably selected from among tantalum, titanium and niobium.

Therefore, the present invention proposes an electrical conductor having the structure of a bimetallic wire provided with a coating composed by a very thin, but compact and hidden, layer of tantalum, or niobium, or titanium, or another transition metal. When used for manufacturing anodic structures designed for operation in extremely aggressive environments, such as, e.g., inside the baths of fluosilicic acid and fluoboric acid, such a copper-based bimetallic wire, by being completely coated by a compact, pore-free layer of, e.g., tantalum, acquires the chemical and corrosion resistance of tantalum, while being furthermore endowed with such characteristics of mechanical strength, formability and stiffness, as required in order to produce from it strong and non-deformable electrodes.

Through the conductor according to the present invention, currents can be caused to flow, the intensity of which is proportional to the cross-section surface area of the copper core, and hence about seven times as intense as those tolerated by a single-metal wire of tantalum of the same diameter. Furthermore, the cost of the electrical conductor according to the present invention is of about one tenth of the cost necessary for manufacturing a single-metal tantalum wire having the same diameter.

According to the present invention, said electrical conductor is manufactured by means of a process for manufacturing an electrical conductor, characterized in that said process comprises the steps of:

(a) inserting a copper bar inside a tube made from said transition metal, with the thickness of the wall of said tube being substantially smaller than the diameter of said copper bar;
(b) inserting said transition metal tube containing said copper bar inside a copper tube;
(c) submitting the three-metal structure obtained from the (b) step to drawing, with its diameter being reduced until a corresponding three-metal wire is obtained, which has a predetermined diameter, and is composed by an inner copper core coated by a thinner layer of said transition metal, which layer is in its turn clad by an outer copper layer;
(d) removing said outer copper layer by means of suitable means, e.g., by dipping in a suitable solvent for copper, which is chemically inert towards said transition metal, in such a way said bimetallic wire, composed by an inner copper core coated by an outer, thinner layer of said transition metal, being obtained.

Also such a manufacturing process is an object of the present invention.

In fact, also such a process is endowed with inventive character, in that it constitutes a surprising solution of the technical problem of rolling and drawing, in particular, tantalum. In fact, tantalum, although is endowed with good cold-processing characteristics, shows difficulties to be transformed into a wire, and into a thin rolled element by means of the methods known from the prior art, because its extremely soft surface tends to stick to the drawing and rolling tools, up to even getting coupled with them, and causing tearings and breakages to occur in the semifinished article.

Inasmuch as according to the production process provided by the present invention, in the above said (b) step, the bimetallic copper-tantalum system is sheltered with an outer copper cladding, in the subsequent drawing steps the tools come into contact with the external copper only, and not with tantalum, which hence results to be protected.

The copper acting as the core of the end bimetallic wire should be endowed with extremely good properties of electrical conductivity. Therefore annealed electrolytic copper is preferred. On the other hand, the copper which performs the function of outer cladding, to be removed in order to obtain the end product, should be above all well workable, need not necessarily endowed with a high electrical conductivity. Therefore, high-plasticity crude copper, e.g., combined with phosphorus, which makes it malleable, will be preferably used.

The preferred characteristics of the present invention are now disclosed in greater detail; it being assumed, in a non-limitative way, that said transition metal is tantalum.

DETAILED DESCRIPTION OF THE PREFERRED EMBODIMENTS

For manufacturing the electrical conductor according to the present invention, the following are preferably used:

an annealed bar of electrolytic copper, having a diameter within the range of from 20 to 40 mm;

a tantalum tube, having a wall thickness comprised within the range of from 0.4 to 0.8 mm, and having an inner diameter corresponding to the diameter of the selected copper bar, with the minimum clearance which makes it possible for both elements to be coupled with each other; and, finally, a tube of high-plasticity, crude copper, having a wall thickness comprised within the range of from 1 to 1.5 mm, and an inner diameter corresponding to the outer diameter of the selected tube of tantalum, with the minimum clearance which makes it possible this second coupling to be accomplished.

After a vigorous brushing of the copper bar by means of a metal brush, and a careful degreasing and pickling of the tantalum tube (above all, of its inner surface) the tantalum tube is slid above the copper bar, and the copper tube is slid around the tantalum tube.

The three-metal bar is pointed by means of an usual pointing machine, and the drawing cycle is started.

By means of three drawer passes, a reduction in thickness of 45/52% is accomplished, after which a first annealing step is carried out, in order to make it possible for the maximum cohesion strength to be obtained between the copper core and the tantalum coating during the subsequent drawing step.

A second drawing step leads, by means of nine passes, to a further reduction in cross-section of 82/88%.

After undergoing a normal annealing, the wire skein is sent to the finishing drawbench, on which the last five drawing passes are carried out, with a further reduction in cross-section of 75/80% being accomplished.

The skein of wire—which has an outer copper cladding of about 100 microns of thickness—is dipped in a bath of $HNO_3$ at 20%, in order to dissolve said copper cladding, with the obviuos precaution of holding both free skein ends out from the bath having to be met. The bath is allowed to react with the wire until all of the copper of the outer cladding is dissolved, and the wire has a shiny, finely knurled surface of tantalum. The wire is thoroughly washed with a large amount of water, and is dried with hot air.

A more specific example of manufacturing of a conductor according to the present invention is now disclosed, it being understood that such an example is in no way limitative of the same invention.

EXAMPLE

An annealed copper bar of DLP Cu, having an outer diameter of 24 mm, is vigorously brushed with a brushing machine provided with metal bristles, and is then slid inside a tube of pure tantalum of 25.4 mm × 0.5 mm, which was previously degreased and acid-pickled according to the techniques known for this metal.

The so-obtained bimetallic bar is slid in its turn inside a well-degreased, crude copper tube of DLP Cu of 28.4 × 1.20 mm. The so assembled three-metal bar is pointed and is submitted to drawing on a linear drawbench, over three passes, down to a diameter of 20.7 mm. The drawn bar is annealed for 2 hours at 650°–680° C. The annealed bar is drawn again on a bull-block machine and, by means of nine passes, the bar is reduced to a wire rod of 8 mm of diameter.

The wire rod is annealed at 650° C., and is drawn again on normal five-pass forging rolls for wire rods, with a wire of 4.20 mm of diameter being produced.

As to lubrication, the die angles, and all of the other drawing parameters, the same techniques as known for copper from the prior art are used. The drawbenchfinished wire is provided with an outer copper cladding of 100 microns, which must be removed by being dissolved by means of 20% nitric acid.

The end semifinished product leaving this bath is a copper wire of from 3.84 to 3.88 mm of diameter, provided with an outer coating of pure tantalum, of from 80 to 60 microns of thickness, well adhering, compact, free from pores, tearings or any other defects which may impair its integrity.

With the so-produced bimetallic wire, suitably activated, an anode was manufactured, which had a useful life of more than 2,000 hours inside the fluoboric bath used for the electrowinning of Pb, at a density of anodic current comprised within the range of from 1,000 to 2,000 $A/m^2$.

The structure did not suffer any alterations.

In order to activate the electrical conductor according to the present invention one can, e.g., incorporate special oxides inside it, which decrease the oxygen overvoltage.

From what was hereinabove generally disclosed and exemplified, one can thus understand how the invention makes it possible the initially stated purpose to be accomplished in a very advantageous way, as regards both the properties of the finished conductor, and the characteristics of the process for manufacturing it.

We claim:

1. An electrical conductor for use in electrochemical processes, consisting essentially of a bimetallic wire composed of an inner core of copper coated by an outer, thinner layer of a transition metal selected from the group consisting of tantalum, titanium and niobium.

2. An electrical conductor comprising an inner core of copper and an outer layer of a transition metal coated directly onto said copper layer, wherein said transition metal is selected from the group consisting of tantalum, titanium and niobium.

3. The electrical conductor of claim 2, wherein said outer layer is compact and free from pores.

4. The electrical conductor of claim 2, wherein said copper is electrolytic copper.

5. Process for manufacturing an electrical conductor comprising the steps of:

(a) inserting a copper bar directly inside a tube made from a transition metal, with the thickness of said tube being substantially smaller than the diameter of said copper bar;

(b) inserting said transition metal tube containing said copper bar inside a copper tube;

(c) submitting the three-metal structure obtained from the (b) step to drawing, with its diameter being reduced until a corresponding three-metal wire is obtained, which has a predetermined diameter, and is composed by an inner copper core coated by a thinner layer of said transition metal, which layer is in its turn clad by an outer copper layer;

(d) removing said outer copper layer, in such a way said bimetallic wire, composed by an inner copper core coated by an outer, thinner layer of said transition metal is obtained.

6. A bimetallic wire obtained in the process according to claim 5.

7. An insoluble anode for electrochemical processes consisting essentially of a bimetallic wire composed of an inner core of copper coated by an outer, thinner layer of a transition metal selected from the group consisting of tantalum, titanium and niobium.

8. Process according to claim 5, wherein said (d) step comprises dipping said three-metal structure in a solvent which dissolves copper but which is chemically inert towards said transition metal.

9. Electrical conductor according to claim 1, wherein said layer of a transition metal is compact and free from pores.

10. Electrical conductor according to claim 1, wherein said copper is electrolytic copper.

11. Electrical conductor according to claim 1, wherein said transition metal is tantalum.

12. The electrical conductor of claim 2, wherein said transition metal is tantalum.

13. Process according to claim 12, wherein said copper bar according to said (a) step is annealed electrolytic copper.

14. Process according to claim 12, wherein said copper tube according to said (b) step is crude copper.

15. Process according to claim 12, wherein said (c) step is performed by carrying out in sequence a plurality of cycles of drawing followed by an annealing.

16. Process according to claim 7, wherein and said solvent is nitric acid.

17. Bimetallic structure produced by the process of said (a) step of the process according to claim 5.

18. Three-metal structure produced by the process of said (b) step of the process according to claim 5.

* * * * *